United States Patent
Uejima (10) Patent No.: US 10,730,522 B2
(45) Date of Patent: Aug. 4, 2020

(54) LANE CHANGE SUPPORT APPARATUS

(71) Applicant: TOYOTA JIDOSHA KABUSHIKI KAISHA, Toyota-shi, Aichi-ken (JP)

(72) Inventor: Taiyo Uejima, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 122 days.

(21) Appl. No.: 16/148,454

(22) Filed: Oct. 1, 2018

(65) Prior Publication Data

US 2019/0126927 A1 May 2, 2019

(30) Foreign Application Priority Data

Nov. 2, 2017 (JP) ................................ 2017-212919

(51) Int. Cl.
| | |
|---|---|
| B60W 30/00 | (2006.01) |
| B60W 30/18 | (2012.01) |
| G05D 1/02 | (2020.01) |
| B60Q 9/00 | (2006.01) |
| B60K 28/06 | (2006.01) |
| B60W 50/14 | (2020.01) |

(52) U.S. Cl.
CPC ....... *B60W 30/18163* (2013.01); *B60K 28/06* (2013.01); *B60Q 9/008* (2013.01); *B60W 50/14* (2013.01); *G05D 1/0212* (2013.01); *B60W 2520/10* (2013.01); *B60W 2540/26* (2013.01); *B60W 2554/00* (2020.02); *G05D 2201/0213* (2013.01)

(58) Field of Classification Search
None
See application file for complete search history.

(56) References Cited

U.S. PATENT DOCUMENTS

| | | | | |
|---|---|---|---|---|
| 7,363,140 | B2 * | 4/2008 | Ewerhart | B60W 30/16 |
| | | | | 701/96 |
| 9,604,609 | B2 * | 3/2017 | Elwart | B60T 8/17557 |
| 9,902,395 | B2 * | 2/2018 | Miura | B60W 30/18 |
| 9,944,294 | B2 * | 4/2018 | Takaso | G05D 1/0255 |
| 9,956,956 | B2 * | 5/2018 | Ali | B60W 30/16 |
| 10,166,997 | B2 * | 1/2019 | Oba | B60W 50/082 |
| 10,220,825 | B2 * | 3/2019 | Otake | B60W 40/08 |
| 10,228,698 | B2 * | 3/2019 | Mimura | G08G 1/167 |
| 10,351,109 | B2 * | 7/2019 | Otake | G08B 25/016 |
| 10,384,540 | B2 * | 8/2019 | Otake | B60W 10/18 |
| 10,464,560 | B2 * | 11/2019 | Sato | B60W 30/12 |
| 10,486,661 | B2 * | 11/2019 | Kurahashi | B60T 8/17 |

(Continued)

FOREIGN PATENT DOCUMENTS

| | | |
|---|---|---|
| JP | 2017-074823 A | 4/2017 |
| JP | 2017-144808 A | 8/2017 |

*Primary Examiner* — Jonathan M Dager
(74) *Attorney, Agent, or Firm* — Sughrue Mion, PLLC (57) ABSTRACT

A lane change support apparatus includes an electronic control unit configured to, when it is recognized that there is an abnormality in a driver of a host vehicle, determine whether or not lane change is possible. The electronic control unit is configured to determine that the lane change is possible when a vehicle speed of the host vehicle is lower than a predetermined upper limit speed, a following vehicle present closest to the host vehicle has stayed in a rear guard vehicle approval range for a predetermined time or longer, and a vehicle is not present in a lane change allowance gap.

6 Claims, 5 Drawing Sheets

(56) References Cited

U.S. PATENT DOCUMENTS

| | | | |
|---|---|---|---|
| 10,589,743 B2* | 3/2020 | Otake | G08G 1/166 |
| 2005/0131597 A1* | 6/2005 | Raz | G07C 5/085 |
| | | | 701/29.1 |
| 2005/0256630 A1* | 11/2005 | Nishira | B60K 31/0008 |
| | | | 701/96 |
| 2010/0217476 A1* | 8/2010 | Kindo | G08G 1/165 |
| | | | 701/31.4 |
| 2013/0018549 A1* | 1/2013 | Kobana | B60K 28/06 |
| | | | 701/41 |
| 2013/0311043 A1* | 11/2013 | Kobana | B60W 30/00 |
| | | | 701/41 |
| 2015/0154458 A1* | 6/2015 | Lee | G06K 9/00798 |
| | | | 348/118 |
| 2015/0166062 A1* | 6/2015 | Johnson | B60W 10/184 |
| | | | 701/41 |
| 2015/0203126 A1* | 7/2015 | Kobana | B60W 30/12 |
| | | | 701/93 |
| 2015/0345961 A1* | 12/2015 | Oooka | B60W 30/143 |
| | | | 701/25 |
| 2016/0001781 A1* | 1/2016 | Fung | G16H 50/20 |
| | | | 701/36 |
| 2016/0091315 A1* | 3/2016 | Oguri | G01C 21/28 |
| | | | 701/408 |
| 2016/0132054 A1* | 5/2016 | Eigel | B60W 50/14 |
| | | | 701/23 |
| 2017/0151960 A1* | 6/2017 | Fujiki | B60W 10/08 |
| 2017/0158054 A1* | 6/2017 | Munaoka | B60Q 1/46 |
| 2017/0232973 A1* | 8/2017 | Otake | B60W 30/12 |
| | | | 701/43 |
| 2017/0297567 A1* | 10/2017 | Matsumura | B60W 40/08 |
| 2017/0322558 A1* | 11/2017 | Teshima | F02D 41/08 |
| 2017/0369044 A1* | 12/2017 | Otake | B60T 7/14 |
| 2018/0001898 A1* | 1/2018 | Otake | B60W 30/09 |
| 2018/0015827 A1* | 1/2018 | Takano | B60K 28/06 |
| 2018/0029604 A1* | 2/2018 | Niino | B60Q 1/525 |
| 2018/0037112 A1* | 2/2018 | Otake | B60W 30/08 |
| 2018/0037216 A1* | 2/2018 | Otake | B60W 30/12 |
| 2018/0091085 A1* | 3/2018 | Tamagaki | B60T 17/18 |
| 2018/0111628 A1* | 4/2018 | Tamagaki | B60W 30/143 |
| 2018/0253975 A1* | 9/2018 | Mizutani | B60W 30/0956 |
| 2019/0135291 A1* | 5/2019 | Sim | B60W 30/18163 |
| 2019/0202450 A1* | 7/2019 | Maeda | B60W 30/09 |
| 2019/0213877 A1* | 7/2019 | Schneider | G08G 1/166 |
| 2019/0308617 A1* | 10/2019 | Groult | B60Q 1/46 |
| 2020/0043254 A1* | 2/2020 | Hase | G07C 5/00 |

* cited by examiner

LANE CHANGE SUPPORT APPARATUS

INCORPORATION BY REFERENCE

The disclosure of Japanese Patent Application No. 2017-212919 filed on Nov. 2, 2017 including the specification, drawings and abstract is incorporated herein by reference in its entirety.

BACKGROUND

1. Technical Field

The present disclosure relates to a lane change support apparatus.

2. Description of Related Art

Japanese Unexamined Patent Application Publication No. 2017-074823 (JP 2017-074823 A) discloses a technique regarding a lane change support apparatus for changing the lane of a host vehicle to an adjacent lane. In the technique, the lane change support apparatus determines that lane change is possible in a case where each of an inter-vehicle distance from a preceding vehicle and a time to collision (hereinafter, also referred to as "TTC") with a preceding vehicle is equal to or greater than a predetermined value. In the technique, the lane change support apparatus determines that lane change is possible in a case where each of an inter-vehicle distance from a following vehicle and the TTC with a following vehicle is equal to or greater than a predetermined value.

SUMMARY

In the technique disclosed in JP 2017-074823 A, the inter-vehicle distance from other vehicles or the TTC with other vehicles is detected by an external sensor that detects surrounding information of the host vehicle. However, the distance recognizable by the external sensor is limited. For this reason, in the technique described above, in a case where the relative speed with respect to other vehicles traveling outside a range recognizable by the external sensor is high, there is a possibility that collision due to lane change cannot be avoided. In particular, a lane change support apparatus for changing the lane automatically in a case where there is an abnormality in the driver may decelerate the host vehicle to ensure safety. For this reason, in the lane change support apparatus described above, the relative speed with respect to other vehicles at the time of changing the lane tends to become higher. Accordingly, the above problem appears more noticeably.

The disclosure provides a lane change support apparatus capable of safely performing a lane change in a case where a driver is recognized as having an abnormality.

An aspect of the disclosure relates to a lane change support apparatus. The lane change support apparatus includes an electronic control unit configured to: recognize an abnormality in a driver of a host vehicle; recognize a vehicle speed of the host vehicle; recognize at least one first vehicle present in a rear guard vehicle approval range, the rear guard vehicle approval range being a range from a first position in a destination lane to a second position in the destination lane, the first position being located behind a rear end of the host vehicle in a destination lane extending direction in which the destination lane extends, the second position being located behind the first position in the destination lane extending direction; recognize a second vehicle present in a lane change allowance gap, the lane change allowance gap being a range from a third position in the destination lane to a fourth position in the destination lane, the third position being located behind the rear end of the host vehicle and ahead of the first position in the destination lane extending direction, the fourth position being located ahead of a front end of the host vehicle in the destination lane extending direction; in a case where the electronic control unit recognizes that there is the abnormality in the driver, determine whether or not lane change is possible based on information including (i) the vehicle speed and (ii) a recognition result of the at least one first vehicle and the second vehicle; determine that the lane change is possible in a case where the vehicle speed of the host vehicle is lower than a first predetermined upper limit speed, a following vehicle present closest to the host vehicle among the at least one first vehicle has stayed in the rear guard vehicle approval range for a predetermined time or longer, and the second vehicle is not present in the lane change allowance gap; and in a case where the electronic control unit determines that the lane change is possible, automatically perform the lane change from a host vehicle lane in which the host vehicle travels to the destination lane, by controlling steering and driving of the host vehicle.

According to the above configuration, in a case where the electronic control unit recognizes that there is an abnormality in the driver of the host vehicle, it is possible to safely perform the lane change to the lane change allowance gap by determining the conditions described above.

In the aspect of the disclosure, the electronic control unit may be configured to execute (i) a function of recognizing a third vehicle present in a rear alarm gap, the rear alarm gap being a range from the rear end of the host vehicle to a fifth position located behind the rear end of the host vehicle in the host vehicle lane in the vehicle traveling direction of the host vehicle, and (ii) a function of recognizing a fourth vehicle present in a lane change destination rear gap, the lane change destination rear gap being a range from the rear end of the host vehicle to a sixth position located behind the rear end of the host vehicle in the destination lane in the destination lane extending direction, and determine that the lane change is possible in a case where the vehicle speed of the host vehicle is equal to or higher than a predetermined medium speed and lower than the first predetermined upper limit speed, the third vehicle is not present in the rear alarm gap, the fourth vehicle is not present in the lane change destination rear gap, and the second vehicle is not present in the lane change allowance gap.

In a case where the vehicle speed of the host vehicle is equal to or higher than the medium speed, it is easy to secure the TTC with the following vehicle. Therefore, even in a case where there is no following vehicle in the rear guard vehicle approval range, the electronic control unit can determine that the lane change is possible unless there is a vehicle in the lane change destination rear gap. However, in a case where there is a following vehicle behind the host vehicle lane, there is a possibility that it is difficult to check the host vehicle from a vehicle on the rear side of the destination lane. According to the above configuration, by determining that there is no following vehicle in the rear alarm gap, it is possible to secure the safety of lane change even in a case where there is no following vehicle in the rear guard vehicle approval range.

In the aspect of the disclosure, the at least one of rear alarm gap and the lane change destination rear gap may be set as variable according to the vehicle speed of the host vehicle.

According to the above configuration, it is possible to further enhance the safety of lane change.

In the aspect of the disclosure, the electronic control unit may be configured to limit the vehicle speed of the host vehicle to a second predetermined upper limit speed or less before the lane change is started in a case where it is recognized that there is the abnormality in the driver.

According to the above configuration, the lane change can be performed safely.

In the aspect of the disclosure, the electronic control unit may be configured to give an alarm that the lane change is to be started before the lane change is started.

According to the above configuration, it is possible to make the following vehicle stay in the rear guard vehicle approval range. As described above, the lane change can be performed safely.

In the aspect of the disclosure, the lane change allowance gap may be set as variable according to the vehicle speed of the host vehicle or a correlation value between the vehicle speed of the host vehicle and a vehicle speed of another vehicle traveling in the destination lane.

According to the above configuration, it is possible to further enhance the safety of lane change.

As described above, according to the aspect of the disclosure, it is possible to provide a lane change support apparatus capable of safely performing a lane change in a case where the driver is recognized as having an abnormality.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings. In the case of referring to the number of elements, the quantity, the range, and the like in the following embodiments, the disclosure is not limited thereto unless otherwise stated or unless the number is clearly specified in principle. Structures, steps, and the like described in the embodiments described below are not necessarily indispensable to the disclosure unless otherwise specified or clearly specified in principle.

Figure 1:
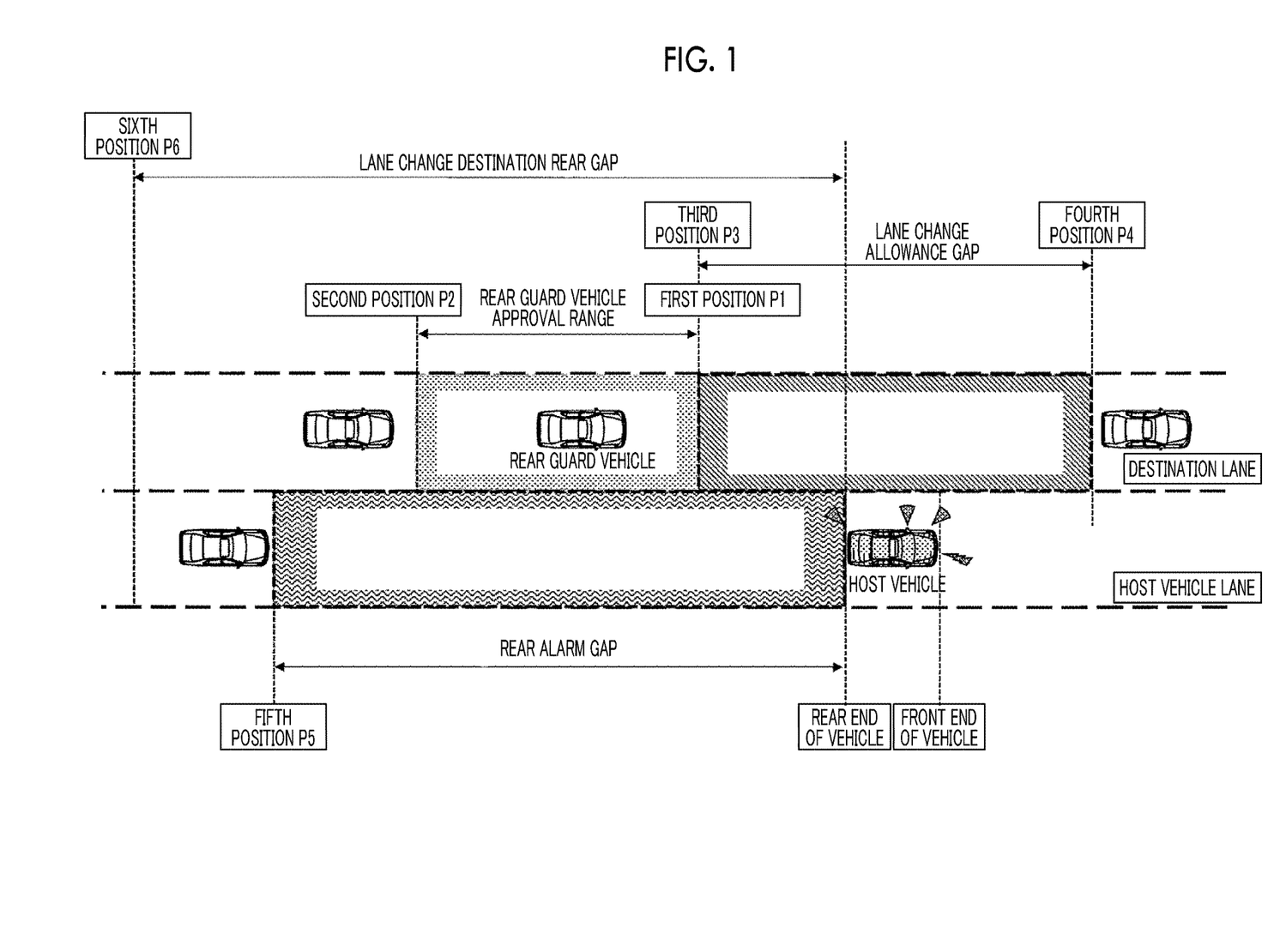
FIG. 1 is a conceptual diagram illustrating the driving support control of a lane change support apparatus according to the present embodiment.

1. First Embodiment 1-1. Outline of Driving Support Control by Lane Change Support Apparatus FIG. 1 is a conceptual diagram illustrating the driving support control of a lane change support apparatus according to the present embodiment. The lane change support apparatus is mounted in a vehicle, and performs driving support control for supporting driving in place of a driver who drives the vehicle in a case where the driver falls into a difficult-to-drive state. In the following description, the vehicle in which the lane change support apparatus is mounted is referred to as a "host vehicle", another vehicle traveling ahead of the host vehicle is referred to as a "preceding vehicle", and another vehicle traveling behind the host vehicle is referred to as a "following vehicle". The lane in which the host vehicle is traveling is referred to as a "host vehicle lane", and the lane to which the host vehicle performs a lane change is referred to as a "destination lane". On the road of one side N lanes (N=1, 2, . . . , n), there are the first traffic zone, the second traffic zone, . . . , the n-th traffic zone in order from the lane that is regulated to the lowest vehicle speed.

In the driving support control, the lane change support apparatus automatically changes the lane of the host vehicle up to the first traffic zone in a case where the driver who drives the vehicle falls into a difficult-to-drive state. In the case of changing the lane, the lane change support apparatus acquires surrounding information of the host vehicle, and determines whether or not the lane of the host vehicle can be changed based on the acquired surrounding information. The surrounding information includes the inter-vehicle distance from other vehicles or the time to collision (TTC) with other vehicles. In a case where the lane change support apparatus determines that the lane change of the host vehicle is possible, the lane change support apparatus changes the lane to the destination lane. In a case where the host vehicle changes the lane up to the first traffic zone, the lane change support apparatus decelerates the host vehicle to stop the host vehicle safely.

In the above-described driving support control, in a case where the driver who drives the vehicle falls into a difficult-to-drive state, decelerating the vehicle speed of the host vehicle to about 50 km/h is needed to ensure safety. In the driving support control in the medium speed range or the low speed range described above, there is a possibility that collision due to lane change cannot be avoided since the relative speed with respect to the following vehicle traveling in the destination lane is high. However, the distance by which the sensor can recognize the target is limited. For this reason, in a case where there is a following vehicle approaching the host vehicle at a high speed from a range that cannot be recognized by the sensor, there is a possibility that the sufficient TTC cannot be secured.

Therefore, the lane change support apparatus according to the present embodiment sets a plurality of regions in the host vehicle lane and the destination lane, and determines whether or not to perform a lane change based on the relationship between each of the regions and the presence or absence of other vehicles. Regions applied in the lane change support apparatus according to the present embodiment are four regions of a rear guard vehicle approval range, a lane change allowance gap, a rear alarm gap, and a lane change destination rear gap.

The rear guard vehicle approval range is a region where it is assumed that the following vehicle in the destination lane that has recognized the intention of a lane change of the host vehicle will stay. In FIG. 1, the rear guard vehicle approval range is expressed as a range from a first position P1 in the destination lane, which is located behind the rear end of the host vehicle in a destination lane extending direction in which the destination lane extends, to a second position P2 located behind the first position P1 in the destination lane extending direction. The first position P1 is a position located behind the host vehicle by a predetermined distance from the rear end of the host vehicle. For example, the first position P1 can be set at a position of 10 m from the rear end of the host vehicle. The second position P2 is a position located behind the host vehicle by a predetermined distance from the rear end of the host vehicle. For example, the second position P2 can be set at a position of 20 m from the rear end of the host vehicle.

The lane change allowance gap is a region to which the host vehicle changes the lane. In FIG. 1, the lane change allowance gap is expressed as a range from a third position P3 in the destination lane, which is located behind the rear end of the host vehicle and ahead of the first position in the destination lane extending direction, to a fourth position P4 located ahead of the front end of the host vehicle in the destination lane extending direction. The third position P3 is a position located behind the host vehicle by a predetermined distance from the rear end of the host vehicle. For example, the third position P3 can be set to 10 m. The fourth position P4 is a position located ahead of the host vehicle by a predetermined distance from the front end of the host vehicle. For example, the fourth position P4 can be set to 10 m. In a case where the third position P3 is set behind the first position P1, the lane change allowance gap overlaps the rear guard vehicle approval range. Therefore, the third position P3 is set to a position in front of the first position P1.

The rear alarm gap is a region of the host vehicle lane that may interfere with the view of the driver of the following vehicle in recognizing the host vehicle traveling in the host vehicle lane from the following vehicle traveling in the destination lane. In FIG. 1, the rear alarm gap is expressed as a range from the rear end of the host vehicle in the host vehicle lane to a fifth position P5 located behind the rear end of the host vehicle in the vehicle traveling direction of the host vehicle. The fifth position P5 is a position located behind the host vehicle by a predetermined distance from the rear end of the host vehicle. For example, the fifth position P5 can be set to 40 m.

A lane change destination rear gap is a region of the destination lane located behind the host vehicle. In FIG. 1, the lane change destination rear gap is expressed as a range from the rear end of the host vehicle in the destination lane to a sixth position P6 located behind the rear end of the host vehicle in the destination lane extending direction. The sixth position P6 is a position located behind the host vehicle by a predetermined distance from the rear end of the host vehicle. For example, the sixth position P6 can be set to 50 m.

Figure 2:
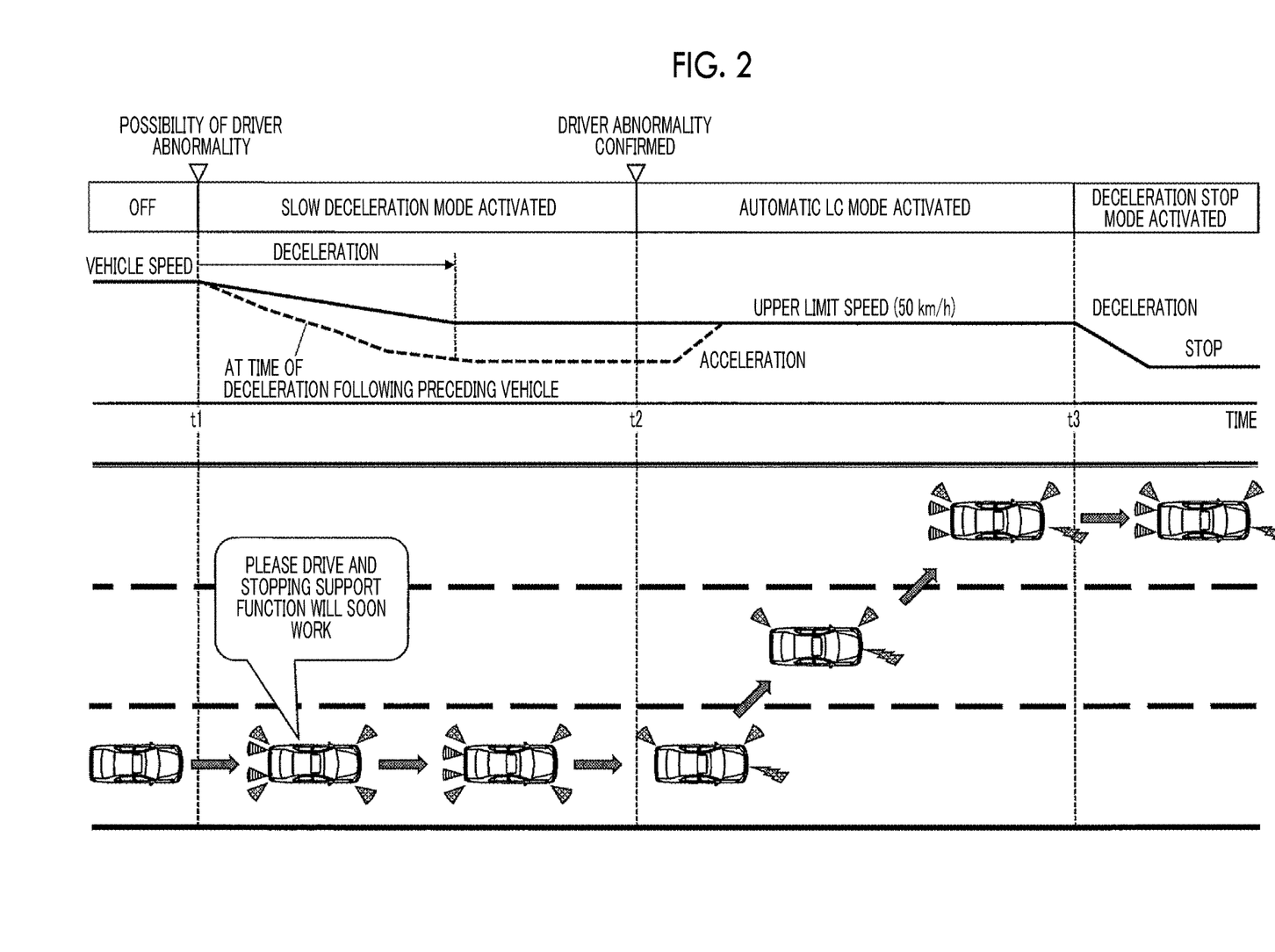
FIG. 2 is an example of a time chart illustrating the driving support control of the lane change support apparatus according to the present embodiment.

The lane change support apparatus according to the present embodiment automatically changes the lane up to the first traffic zone in a case where the driver who drives the vehicle falls into a difficult-to-drive state. After the lane change, the lane change support apparatus performs driving support control to decelerate and stop the vehicle. FIG. 2 is an example of a time chart illustrating the driving support control of the lane change support apparatus according to the present embodiment. In the following description, the outline of the driving support control will be described with reference to FIG. 2 in addition to FIG. 1.

As shown in FIG. 2, for example, in a case where the driver who drives the vehicle falls into a difficult-to-drive state at time t1, the lane change support apparatus according to the present embodiment activates a slow deceleration mode. In the slow deceleration mode, the upper limit of the vehicle speed is limited to a predetermined upper limit speed (for example, 50 km/h) suitable for lane change. As described above, in a case where the vehicle speed V of the host vehicle is higher than the upper limit speed, control to decelerate the host vehicle to the upper limit speed is performed. In the slow deceleration mode, the lane change support apparatus warns the driver. This warning is a warning prompting the driver to drive or a warning indicating that the driving of the host vehicle is automatically supported by the driving support control, such as "please drive and the stopping support function will soon work". In the slow deceleration mode, alarm control for notifying other surrounding vehicles or the like of the possibility of abnormality in the driver may be provided. As the alarm control described above, for example, control to turn on or blink a lighting device or a direction indicator of the host vehicle or control to sound a horn toward the outside from a horn device may be performed.

In a case where there is no response from the driver despite giving the warning to the driver until time t2 after the elapse of a predetermined time, the lane change support apparatus confirms that there is an abnormality in the driver, and activates an automatic lane change (LC) mode in which the lane is automatically changed to the first traffic zone regulated to the lowest vehicle speed. In the automatic LC mode, the lane change support apparatus blinks the direction indicator for the destination lane. In the above case, the lane change support apparatus may also sound a horn toward the outside from the horn device.

In the slow deceleration mode, in a case where the vehicle speed of the host vehicle is lower than the upper limit speed, the lane change support apparatus may first increase the vehicle speed of the host vehicle to the upper limit speed in a case where the automatic LC mode is activated. The situation described above may occur, for example, in a case where the host vehicle decelerates following the deceleration of a preceding vehicle in a case where preceding vehicle following control to follow the preceding vehicle is being performed, as indicated by the chain line in FIG. 2. By increasing the vehicle speed of the host vehicle to the upper limit speed in the automatic LC mode, the relative speed with respect to other surrounding vehicles can be reduced. Therefore, it is possible to further increase the possibility that determination as to whether or not to perform a lane change, which will be described later, will be correct.

The lane change support apparatus determines whether or not to perform a lane change based on whether or not another vehicle belongs to each region described above. In the determination, the lane change support apparatus determines that another vehicle belongs to each region described above in a case where the vehicle belongs to a part of each region.

In the automatic LC mode, the direction indicator is blinked to indicate the intention of the lane change of the host vehicle to the outside. For this reason, the lane change support apparatus can determine that the following vehicle staying in the rear guard vehicle approval range for a predetermined time (for example, 2 seconds) or longer recognizes the intention of the lane change of the host vehicle. The following vehicle described above can be said to serve to guard other following vehicles approaching the host vehicle at a high speed from the further rear side of the destination lane. In the following description, the following vehicle staying in the rear guard vehicle approval range is also referred to as a "rear guard vehicle". Therefore, the lane change support apparatus determines that the lane change of the host vehicle is possible in a case where the following vehicle stays in the rear guard vehicle approval range for a predetermined time (for example, 2 seconds) or longer and other vehicles do not belong to the lane change allowance gap including the region of the lane change destination. In the following description, the above-described lane change conditions are referred to as "LC conditions 1". As described above, it is possible to eliminate the risk of collision with a following vehicle approaching at a high speed from the rear side of the destination lane.

In a case where the host vehicle is traveling at a predetermined medium speed (for example, 45 km/h) or higher, it is difficult to imagine that the relative speed with respect to the following vehicle becomes extremely high. Therefore, in a case where the host vehicle is traveling at a predetermined medium speed (for example, 45 km/h) or higher, the lane change support apparatus can determine that the lane change of the host vehicle is possible in a case where other vehicles are not present in the lane change allowance gap, the rear alarm gap, and the lane change destination rear gap. In the following description, the above-described lane change conditions are referred to as "LC conditions 2". As described above, it is possible to eliminate the risk of collision with a following vehicle approaching at a high speed from the rear side of the destination lane.

In a case where the LC conditions 1 or the LC conditions 2 are satisfied, the lane change support apparatus according to the present embodiment determines that the lane change of the host vehicle is possible, and changes the lane to the destination lane. The lane change support apparatus repeats the lane change operation described above until the host vehicle reaches the first traffic zone. In a case where the host vehicle reaches the first traffic zone at time t3, the lane change support apparatus activates a deceleration stop mode in which the host vehicle is decelerated and stopped. As described above, the host vehicle is safely stopped in the first traffic zone. According to the lane change support apparatus described above, it is possible to safely perform the lane change in a case where the driver is recognized as having an abnormality.

Depending on the circumstances of other vehicles, a situation in which neither the LC conditions 1 nor the LC conditions 2 are satisfied may continue for a long time. Therefore, in a case where the situation in which neither the LC conditions 1 nor the LC conditions 2 are satisfied continues for a predetermined time or a predetermined distance or longer, the lane change support apparatus decelerates and stops the host vehicle in the current lane. As described above, in a case where the driver is recognized as having an abnormality, it is possible to avoid traveling for a long time.

1-2. Configuration Example of Lane Change Support Apparatus

Figure 3:
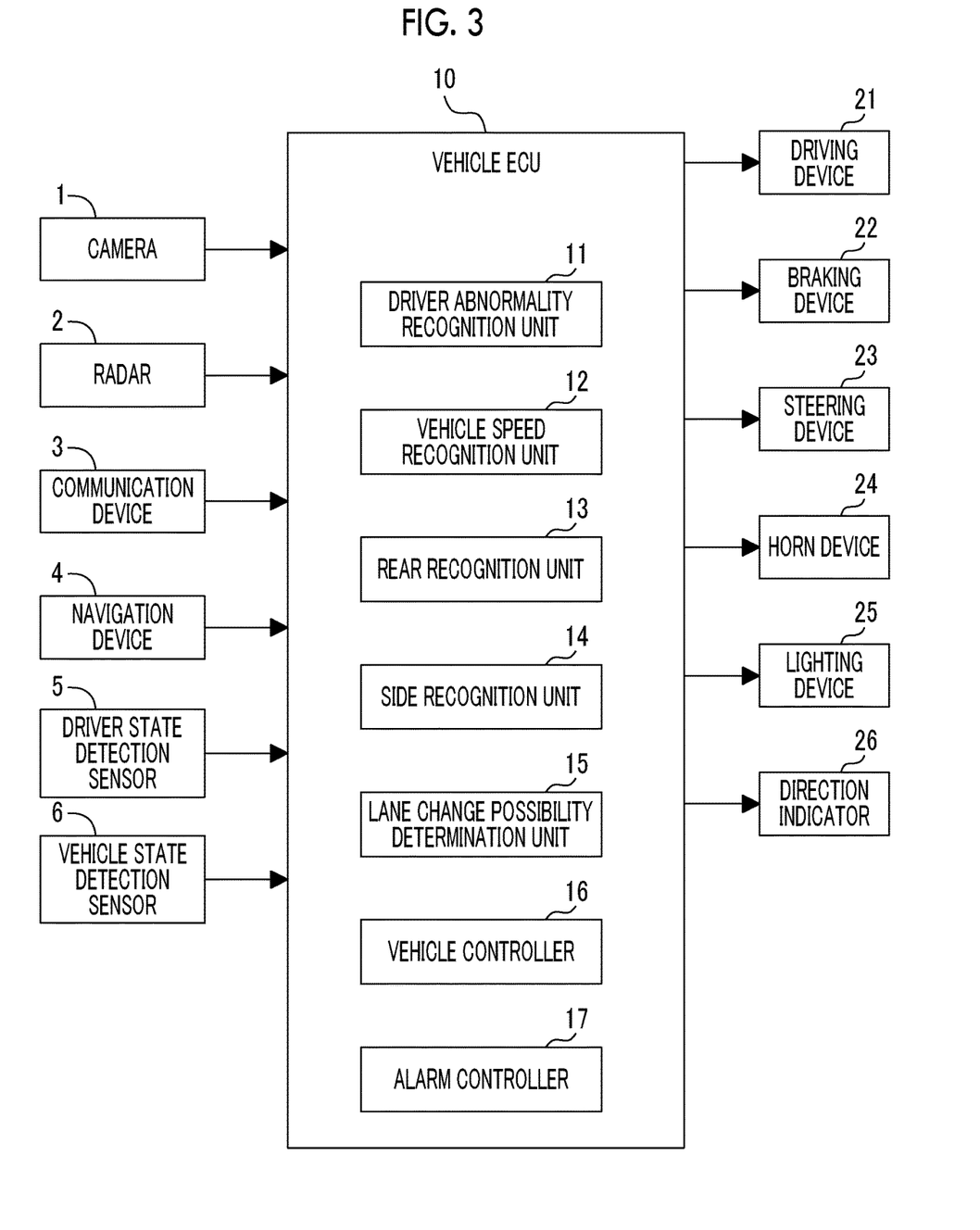
FIG. 3 is a diagram showing the schematic configuration of the lane change support apparatus of the present embodiment.

A configuration example of the lane change support apparatus that performs the above-described driving support control will be described. FIG. 3 is a diagram showing the schematic configuration of the lane change support apparatus of the present embodiment. The lane change support apparatus shown in FIG. 3 is mounted in a vehicle, and performs driving support control for supporting driving in place of a driver who drives the vehicle in a case where the driver falls into a difficult-to-drive state.

As shown in FIG. 3, the lane change support apparatus is configured to include a vehicle electronic control unit (ECU) 10 mounted in the host vehicle. The lane change support apparatus is configured to include a camera 1, a radar 2, a communication device 3, a navigation device 4, a driver state detection sensor 5, and a vehicle state detection sensor 6 that are connected to the input side of the vehicle ECU 10. The lane change support apparatus is configured to further include a driving device 21, a braking device 22, a steering device 23, a horn device 24, a lighting device 25, and a direction indicator 26 that are connected to the output side of the vehicle ECU 10.

The camera 1 functions as information acquisition means for acquiring the surrounding information of the host vehicle, such as a front camera for capturing an image of the front of the host vehicle or a right rear camera and a left rear camera for capturing images of the right and left rear of the host vehicle. The image captured by the camera 1 is transmitted to the vehicle ECU 10 as image data at any time, and image processing on the image data is performed by the vehicle ECU 10. The surrounding information acquired by the camera 1 is, for example, position information of other vehicles traveling ahead of and behind the host vehicle or road information, such as white line information and signal information.

The radar 2 is, for example, a laser radar or a millimeter wave radar, and functions as information acquisition means for acquiring the surrounding information of the host vehicle. The radar 2 transmits laser waves or the like to the front and rear sides of the host vehicle and receives reflected waves of the transmitted laser waves to acquire the surrounding information of the host vehicle. The surrounding information acquired by the radar 2 is, for example, information regarding the presence or absence of other vehicles, information of the distance to other vehicles, an angle (that is, relative position), or speed (relative speed), and position information of utility poles, buildings, and the like. Each piece of information detected by the radar 2 is transmitted to the vehicle ECU 10 at any time.

The communication device 3 functions as information acquisition means for receiving surrounding information from a roadside device provided on a road through an antenna provided in the host vehicle. The roadside device is a beacon device that transmits, for example, congestion information, traffic information by lane, regulation information such as temporary stop, and information of traffic situation at a blind spot location. The communication device 3 also functions as information acquisition means for communicating directly with other vehicles around the host vehicle through an antenna or communicating with other vehicles around the host vehicle through a relay device (not shown). The surrounding information acquired herein is the position information of other vehicles, speed information, and information regarding the operation state (for example, whether or not the direction indicator is operated). Each piece of information received by the communication device 3 is transmitted to the vehicle ECU 10 at any time.

The navigation device 4 detects the current position of the host vehicle from a global positioning system (GPS) satellite through an antenna, and detects the traveling speed of the host vehicle or guides a route to the destination using the GPS, a speed sensor, a gyroscope, and the like. The navigation device 4 has map data including detailed road information. The map data includes information regarding the shape of the road, the number of lanes, and the lane width, for example. The current position information, the road information, and the like acquired by the navigation device 4 are transmitted to the vehicle ECU 10 at any time.

The driver state detection sensor 5 detects the state of the driver who drives the host vehicle. Examples of the state of the driver detected herein include the driving posture of the driver, a heartbeat condition, and a breathing state. The driving posture of the driver is grasped, for example, by imaging the posture or eyes (movement of eyes) of the driver under driving with a camera for imaging the driver installed in the vehicle. The heartbeat condition of the driver is grasped, for example, by detecting the heart rate of the driver grasping the steering wheel with electrodes built in the steering wheel. The breathing state of the driver is grasped by observing a change in the detection value of a load sensor built in the seat on which the driver is seated. The method of detecting the state of the driver is not particularly limited, and any method in which a driver abnormality recognition unit 11, which will be described later, can determine whether or not the driver is in a difficult-to-drive state can be used.

The vehicle state detection sensor 6 detects the traveling state of the host vehicle. As the vehicle state detection sensor 6, a speed sensor, a lateral acceleration sensor, a yaw rate sensor, and the like can be exemplified. The information detected by the vehicle state detection sensor 6 is transmitted to the vehicle ECU 10.

The driving device 21 is a driving source of the host vehicle, for example, an engine. The driving force generated by the driving device 21 is transmitted to the driving wheels through a power transmission path (not shown). In the engine as the driving device 21, the fuel injection amount, the fuel injection timing, the throttle opening degree, and the like are controlled by a vehicle controller 16 to be described later. In this manner, the driving force of the host vehicle is controlled.

The braking device 22 is configured to include a brake device and a brake actuator, and automatically applies a braking force to each wheel irrespective of the brake operation of the driver. The brake device is a general brake device, such as a full air type drum brake that generates a braking force on the front wheels and the rear wheels by using air pressure according to the driver's operation of depressing the brake pedal. Apart from the brake operation of the driver, the brake actuator generates a braking force of any magnitude on each wheel as an automatic brake based on a command from the vehicle controller 16 to be described later.

The steering device 23 is configured to include a steering and a steering actuator, and automatically controls the steering angle irrespective of the steering operation of the driver. The steering is a general steering device that changes the direction of the wheels according to the steering operation of the driver. Apart from the steering operation of the driver, the steering actuator changes the direction of the wheels as automatic steering based on a command from the vehicle controller 16 to be described later.

The horn device 24 is an alarm device that makes a sound (a horn) by operating a horn switch built in the steering wheel to send alarm to the outside of the vehicle, for example. The lighting device 25 includes headlamps provided on the right and left of the front surface of the host vehicle and tail lamps and brake lamps provided on the right and left of the rear surface of the host vehicle. There are two types of headlamps of a high beam and a low beam in the lighting device 25. The headlamp also functions as an alarm device for sending alarm to the front side of the vehicle by blinking the high beam while the low beam is lit, that is, performing so-called passing. The taillight or the brake light of the lighting device 25 also functions as an alarm device for sending alarm to the rear side of the vehicle by blinking either the taillight or the brake light. The direction indicator 26 is an alarm device that is provided at least at each of the right and left ends of the front and rear of the host vehicle in order to notify other vehicles and the like of the traveling direction of the host vehicle.

1-3. Description of Function of Vehicle ECU

The vehicle ECU 10 is a computer including a central processing unit (CPU) for executing various kinds of arithmetic processing, a read only memory (ROM) in which programs or data needed for the control of the vehicle ECU 10 is stored, a random access memory (RAM) in which calculation results of the CPU and the like are temporarily stored, an input and output port for receiving and outputting a signal from and to the outside, and the like.

In the vehicle ECU 10 of the present embodiment, in a case where the driver who drives the host vehicle falls into a difficult-to-drive state, driving support control is performed to change the lane of the host vehicle to a lane on the lowest speed side and decelerate and stop the host vehicle. As functional blocks for realizing the above-described driving support control or control associated with the driving support control, the vehicle ECU 10 has the driver abnormality recognition unit 11, a vehicle speed recognition unit 12, a rear recognition unit 13, a side recognition unit 14, a lane change possibility determination unit 15, the vehicle controller 16, and an alarm controller 17.

The driver abnormality recognition unit 11 is a functional block for recognizing whether or not there is an abnormality in the state (health condition) of the driver, that is, whether or not the driver is in a difficult-to-drive state based on the information transmitted from the driver state detection sensor 5. "There is an abnormality in the driver" referred to herein means, for example, a state in which it is difficult for the driver to drive the host vehicle such as a case where the heartbeat of the driver stops or a case where the driver falls into a coma state, a state in which it is unclear whether or not the driver can drive the host vehicle such as inattention and no operation, and a state in which the driver cannot drive the host vehicle at all. The recognition result of the driver abnormality recognition unit 11 is transmitted to the lane change possibility determination unit 15, the vehicle controller 16, and the alarm controller 17.

The vehicle speed recognition unit 12 is a functional block for recognizing the current vehicle speed V of the host vehicle based on the information transmitted from the vehicle state detection sensor 6. The vehicle speed V recognized by the vehicle speed recognition unit 12 is transmitted to the lane change possibility determination unit 15 and the vehicle controller 16.

The rear recognition unit 13 is a functional block for recognizing the state of a following vehicle traveling behind the host vehicle based on the surrounding information acquired from the camera 1, the radar 2, the communication device 3, and the navigation device 4 that are information acquisition means. Specifically, the rear recognition unit 13 determines the presence or absence of a following vehicle traveling in the rear guard vehicle approval range, the rear alarm gap, and the lane change destination rear gap. The determination result is transmitted to the lane change possibility determination unit 15.

The side recognition unit 14 is a functional block for recognizing the state of a side vehicle traveling on the side of the host vehicle based on the surrounding information acquired from the camera 1, the radar 2, the communication device 3, and the navigation device 4 that are information acquisition means. Specifically, the side recognition unit 14 determines the presence or absence of other vehicles traveling in the lane change allowance gap. The determination result is transmitted to the lane change possibility determination unit 15.

The lane change possibility determination unit 15 is a functional block for determining whether or not the host vehicle can change the lane to the destination lane based on the information transmitted from the driver abnormality recognition unit 11, the vehicle speed recognition unit 12, the rear recognition unit 13, and the side recognition unit 14. The specific determination performed by the lane change possibility determination unit 15 will be described in detail with reference to a flowchart to be described later. The determination result is transmitted to the vehicle controller 16.

The vehicle controller 16 is a functional block that functions as vehicle control means for automatically controlling the driving of the host vehicle based on the information transmitted from the driver abnormality recognition unit 11, the vehicle speed recognition unit 12, and the lane change possibility determination unit 15. Specifically, the vehicle controller 16 executes a slow deceleration mode in which the vehicle speed of the host vehicle is automatically limited to predetermined upper limit speed (for example, 50 km/h) in a case where there is an abnormality in the state of the driver. In a case where the lane change possibility determination unit 15 determines that the lane change of the host vehicle is possible, the vehicle controller 16 executes the automatic LC mode in which the lane is automatically changed to the destination lane. In a case where there is an abnormality in the state of the driver, the vehicle controller 16 executes a deceleration stop mode in which the host vehicle is automatically decelerated and stopped in a case where the host vehicle is traveling in the first traffic zone.

In the slow deceleration mode, the vehicle controller 16 gradually reduces the vehicle speed V of the host vehicle to a predetermined upper limit by controlling the driving force of the driving device 21 and the braking force of the braking device 22. The vehicle controller 16 controls the vehicle speed of the host vehicle by controlling the driving force of the driving device 21 and the braking force of the braking device 22 according to the vehicle speed of a control target vehicle, so that the host vehicle follows the control target vehicle.

In the automatic LC mode, the vehicle controller 16 changes the lane to the destination lane by performing vehicle speed control for controlling the vehicle speed of the host vehicle and steering angle control for controlling the steering angle. The vehicle controller 16 controls the vehicle speed V of the host vehicle by controlling the driving force of the driving device 21 and the braking force of the braking device 22. The direction of the wheels is controlled by controlling the steering actuator of the steering device 23, thereby changing the driving lane from the host vehicle lane to the destination lane.

In the deceleration stop mode, the vehicle controller 16 gradually reduces the vehicle speed V of the host vehicle to stop the host vehicle by controlling the driving force of the driving device 21 and the braking force of the braking device 22. The specific control performed by the vehicle controller 16 will be described in detail with reference to a flowchart to be described later.

The alarm controller 17 is a functional block for giving an alarm to other vehicles and the like around the host vehicle of the abnormality in the driver, deceleration of the host vehicle, lane change, and the like by controlling the horn device 24, the lighting device 25, or the direction indicator 26. Specifically, in a case where the driver abnormality recognition unit 11 recognizes that the driver is abnormal, the alarm controller 17 sends alarm of the occurrence of the abnormality by controlling the horn device 24, the lighting device 25, or the direction indicator 26. In the automatic LC mode, the alarm controller 17 sends alarm of the intention of lane change by blinking the direction indicator 26 for the lane change destination. In the automatic LC mode, the alarm controller 17 may also send alarm of the intention of the lane change of the host vehicle by sounding a horn with the horn device 24. In the deceleration stop mode and the slow deceleration mode, the alarm controller 17 gives an alarm that the host vehicle is decelerating by blinking the lighting device 25. In the deceleration stop mode and the slow deceleration mode, the alarm controller 17 may also give an alarm that the host vehicle is decelerating by sounding a horn with the horn device 24 in addition to the lighting device 25.

1-4. Specific Processing of Driving Support Control

Figure 4:
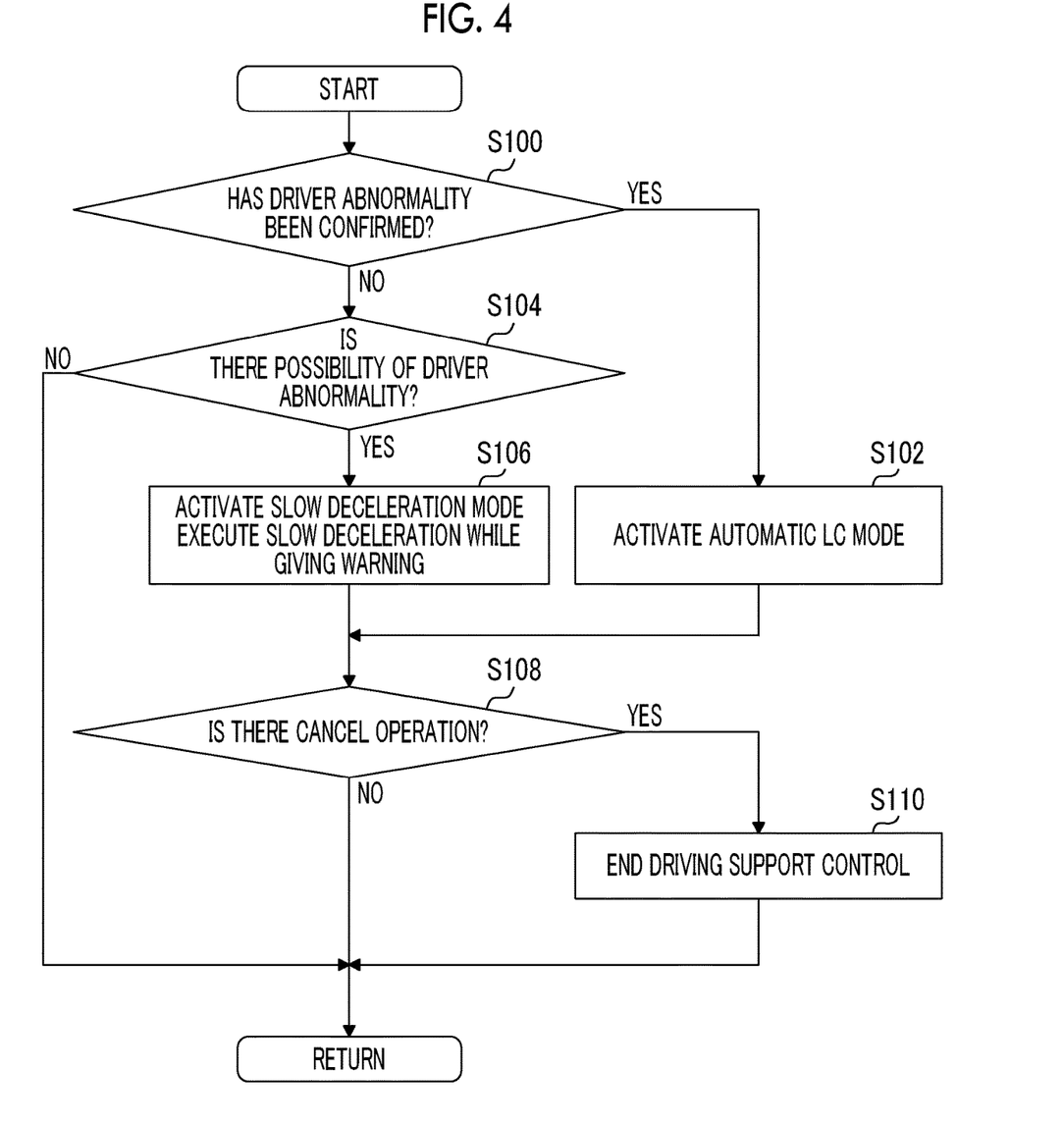
FIG. 4 is a flowchart showing the routine of the driving support control performed in the present embodiment.
Figure 5:
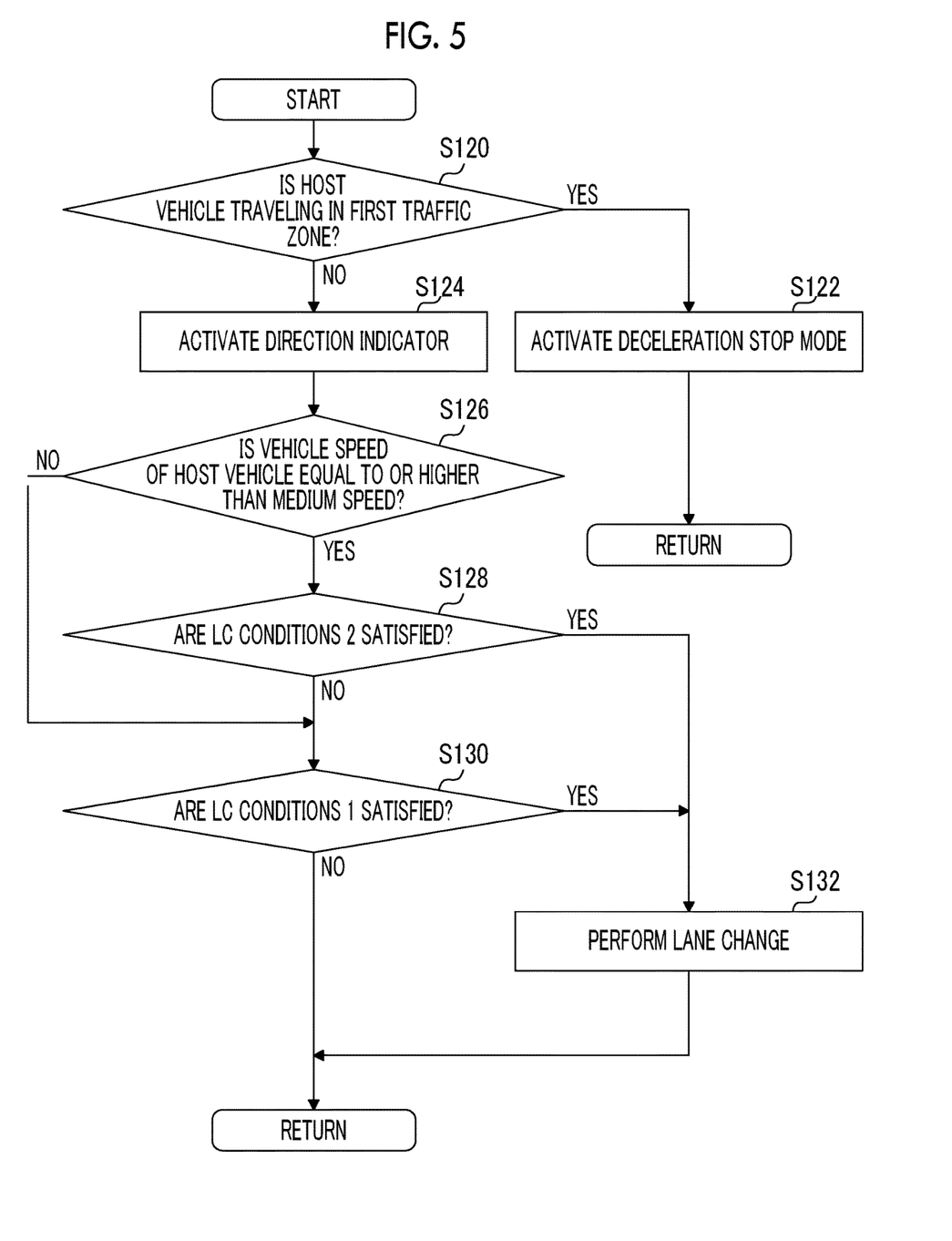
FIG. 5 is a flowchart showing the routine of the driving support control performed in the present embodiment.

Specific processing of the driving support control performed by the lane change support apparatus of the present embodiment having the above configuration will be described with reference to the flowchart. FIGS. 4 and 5 are flowcharts showing the routine of the driving support control performed in the present embodiment. The routine shown in FIG. 4 is repeatedly executed by the vehicle ECU 10 at a predetermined control cycle (for example, 0.1 sec) while the host vehicle is traveling. The routine shown in FIG. 5 is executed in a case where the automatic LC mode is activated in the routine shown in FIG. 4.

In a case where the routine shown in FIG. 4 is started, first, the vehicle ECU 10 determines whether or not the driver abnormality has been confirmed (step S100). Here, the vehicle ECU 10 determines whether or not a predetermined time has passed from a warning to the driver in step S106 to be described later. In a case where the driver does not respond to the call, such as a warning, the vehicle ECU 10 can determine that an abnormality has occurred in the driver. As the predetermined time herein, a time set in advance as a time for determining whether or not the driver is abnormal is used. As a result, in a case where the vehicle ECU 10 determines that an abnormality has occurred in the driver, the vehicle ECU 10 activates the automatic LC mode (step S102). Here, the routine shown in FIG. 5 to be described later is executed.

On the other hand, in a case where the vehicle ECU 10 determines that no abnormality has occurred in the driver in step S100, the vehicle ECU 10 determines whether or not there is a possibility of abnormality in the driver (step S104). Here, the driver abnormality recognition unit 11 in the vehicle ECU 10 determines whether or not there is a possibility that the driver's state (health condition) is abnormal. As a result, in a case where the vehicle ECU 10 determines that there is no possibility that the driver's state (health condition) is abnormal, the vehicle ECU 10 determines that the driving support control is not needed, and ends this routine.

On the other hand, in a case where the vehicle ECU 10 determines that there is a possibility that the driver's state (health condition) is abnormal in step S104, the vehicle ECU 10 activates the slow deceleration mode (step S106). Here, the driver abnormality recognition unit 11 in the vehicle ECU 10 gives a warning to the driver. The warning herein is, for example, a warning prompting the driver to drive or a warning indicating that the driving of the host vehicle is automatically supported by the driving support control. The vehicle controller 16 in the vehicle ECU 10 automatically decelerates the vehicle speed of the host vehicle to a predetermined upper limit speed (for example, 50 km/h).

The vehicle ECU 10 determines whether or not there is a cancel operation by the driver (step S108). The cancel operation herein is an input operation by which the vehicle ECU 10 can determine that the driver's state has returned to the normal state, such as an operation of a cancel switch by the driver. As a result, in a case where the vehicle ECU 10 determines that there is a cancel operation by the driver, the vehicle ECU 10 determines that the driver's state has returned to the normal state, and ends the driving support control in this routine (step S110). Here, the vehicle ECU 10 ends all the modes being activated, and ends this routine.

On the other hand, in a case where the vehicle ECU 10 determines that there is no cancel operation by the driver in step S108, the vehicle ECU 10 can determine that there is still an abnormality in the driver or there is a possibility of abnormality in the driver. In the above-described case, the vehicle ECU 10 continues the mode being activated, and ends this routine.

In step S102 of the routine shown in FIG. 4 described above, in a case where an abnormality in the driver is confirmed, the automatic LC mode is activated. In the automatic LC mode, the vehicle ECU 10 repeatedly executes the routine shown in FIG. 5.

In the routine shown in FIG. 5, first, the vehicle ECU 10 determines whether or not the host vehicle is traveling in the first traffic zone (step S120). The camera 1, the radar 2, the communication device 3, and the navigation device 4 in the vehicle ECU 10 acquire the surrounding information of the host vehicle. Here, the vehicle ECU 10 determines whether or not the host vehicle is traveling in the first traffic zone based on the acquired surrounding information. As a result of the determination, in a case where the vehicle ECU 10 determines that the host vehicle is traveling in the first traffic zone, the vehicle ECU 10 determines that a further lane change is not needed, and activates the deceleration stop mode (step S122). In the deceleration stop mode, the vehicle controller 16 in the vehicle ECU 10 gradually reduces the vehicle speed of the host vehicle to stop the host vehicle.

On the other hand, in a case where the vehicle ECU 10 determines that the host vehicle is not traveling in the first traffic zone in step S120, the vehicle ECU 10 can determine that the lane of the host vehicle needs to be automatically changed toward the first traffic zone. In the above-described case, the process proceeds to the next step to activate the direction indicator 26 (step S124). Here, the alarm controller 17 in the vehicle ECU 10 blinks the direction indicator 26 on the destination lane side.

In the routine shown in FIG. 5, the vehicle ECU 10 determines whether or not the vehicle speed V of the host vehicle is equal to or higher than a predetermined medium speed (for example, 45 km/h) (step S126). As a result of the determination, in a case where the vehicle ECU 10 determines that the vehicle speed V of the host vehicle is equal to or higher than the predetermined medium speed (for example, 45 km/h), the vehicle ECU 10 determines whether or not the LC conditions 2 for determining whether or not to change the lane are satisfied (step S128). As a result of the determination, in a case where the vehicle ECU 10 determines that the LC conditions 2 are satisfied, the vehicle ECU 10 determines that lane change to the destination lane is possible, and the lane change is performed (step S132). Specifically, the vehicle controller 16 of the vehicle ECU 10 changes the lane to the destination lane by performing vehicle speed control for controlling the vehicle speed of the host vehicle and steering angle control for controlling the steering angle.

On the other hand, in a case where the vehicle ECU 10 determines that the LC conditions 2 are not satisfied in step S128 or in a case where the vehicle ECU 10 determines that the vehicle speed V of the host vehicle is not equal to or higher than the predetermined medium speed (for example, 45 km/h) in step S126, the vehicle ECU 10 determines whether or not the LC conditions 1 for determining whether or not to change the lane are satisfied (step S130). As a result of the determination, in a case where the vehicle ECU 10 determines that the LC conditions 1 are satisfied, the process proceeds to step S132. In a case where the vehicle ECU 10 determines that the LC conditions 1 are not satisfied, the vehicle ECU 10 ends this routine.

According to the control described above, it is possible to safely perform the lane change in a case where the driver is recognized as having an abnormality.

1-5. Modification Example of Lane Change Support Apparatus According to Present Embodiment The lane change support apparatus according to the present embodiment can be modified as follows.

The rear alarm gap and the lane change destination rear gap may be variably set according to the vehicle speed of the host vehicle. Specifically, for example, the lane change destination rear gap may be set so as to become longer as the vehicle speed of the host vehicle becomes lower. The rear alarm gap may be set so as to become longer as the vehicle speed of the host vehicle becomes lower. As described above, it is possible to further enhance the safety at the time of lane change.

The lane change allowance gap may be variably set according to the relative speed between the host vehicle and other vehicles. Specifically, for example, the lane change allowance gap may be set such that the distance between the fourth position P4 and the front end of the vehicle becomes shorter as the relative speed with respect to a preceding vehicle closest to the host vehicle traveling in the destination lane becomes lower. The lane change allowance gap may also be set such that the distance between the third position P3 and the rear end of the vehicle becomes shorter as the relative speed with respect to a following vehicle closest to the host vehicle traveling in the destination lane becomes lower. The lane change allowance gap may be variably set as a correlation value of the relative speed between the host vehicle and other vehicles, for example, according to the TTC.

The determination as to whether or not a vehicle is present in the lane change allowance gap may be made according to whether or not the TTC with a preceding vehicle closest to the host vehicle traveling in the destination lane is equal to or greater than a predetermined value and the TTC with a following vehicle closest to the host vehicle traveling in the destination lane is equal to or greater than a predetermined value.

The determination as to whether or not a rear guard vehicle has stayed in the rear guard vehicle approval range for a predetermined time or loner may be made according to whether or not a following vehicle closest to the host vehicle traveling in the destination lane is present in the rear guard vehicle approval range and the TTC with the following vehicle is equal to or greater than a predetermined value.

What is claimed is:

1. A lane change support apparatus comprising an electronic control unit configured to:
   - recognize an abnormality in a driver of a host vehicle;
   - recognize a vehicle speed of the host vehicle;
   - recognize at least one first vehicle present in a rear guard vehicle approval range, the rear guard vehicle approval range being a range from a first position in a destination lane to a second position in the destination lane, the first position being located behind a rear end of the host vehicle in a destination lane extending direction in which the destination lane extends, the second position being located behind the first position in the destination lane extending direction;
   - recognize a second vehicle present in a lane change allowance gap, the lane change allowance gap being a range from a third position in the destination lane to a fourth position in the destination lane, the third position being located behind the rear end of the host vehicle and ahead of the first position in the destination lane extending direction, the fourth position being located ahead of a front end of the host vehicle in the destination lane extending direction;
   - in a case where the electronic control unit recognizes that there is the abnormality in the driver, determine whether or not lane change is possible based on information including (i) the vehicle speed and (ii) a recognition result of the at least one first vehicle and the second vehicle;
   - determine that the lane change is possible in a case where the vehicle speed of the host vehicle is lower than a first predetermined upper limit speed, a following vehicle present closest to the host vehicle among the at least one first vehicle has stayed in the rear guard vehicle approval range for a predetermined time or longer, and the second vehicle is not present in the lane change allowance gap; and
   - in a case where the electronic control unit determines that the lane change is possible, automatically perform the lane change from a host vehicle lane in which the host vehicle travels to the destination lane, by controlling steering and driving of the host vehicle.

2. The lane change support apparatus according to claim 1, wherein
   the electronic control unit is configured to
   execute (i) a function of recognizing a third vehicle present in a rear alarm gap, the rear alarm gap being a range from the rear end of the host vehicle to a fifth position located behind the rear end of the host vehicle in the host vehicle lane in the vehicle traveling direction of the host vehicle, and (ii) a function of recognizing a fourth vehicle present in a lane change destination rear gap, the lane change destination rear gap being a range from the rear end of the host vehicle to a sixth position located behind the rear end of the host vehicle in the destination lane in the destination lane extending direction, and
   determine that the lane change is possible in a case where the vehicle speed of the host vehicle is equal to or higher than a predetermined medium speed and lower than the first predetermined upper limit speed, the third vehicle is not present in the rear alarm gap, the fourth vehicle is not present in the lane change destination rear gap, and the second vehicle is not present in the lane change allowance gap.

3. The lane change support apparatus according to claim 2, wherein the at least one of rear alarm gap and the lane change destination rear gap is set as variable according to the vehicle speed of the host vehicle.

4. The lane change support apparatus according to claim 1, wherein the electronic control unit is configured to limit the vehicle speed of the host vehicle to a second predetermined upper limit speed or less before the lane change is started in a case where it is recognized that there is the abnormality in the driver.

5. The lane change support apparatus according to claim 1, wherein the electronic control unit is configured to give an alarm that the lane change is to be started before the lane change is started.

6. The lane change support apparatus according to claim 1, wherein the lane change allowance gap is set as variable according to the vehicle speed of the host vehicle or a correlation value between the vehicle speed of the host vehicle and a vehicle speed of another vehicle traveling in the destination lane.

* * * * *